United States Patent
Yi et al.

(10) Patent No.: US 9,684,352 B2
(45) Date of Patent: Jun. 20, 2017

(54) MEMORY SYSTEM AND OPERATING METHOD THEREOF

(71) Applicant: SK hynix Inc., Gyeonggi-do (KR)

(72) Inventors: Yeong Sik Yi, Seoul (KR); Jong Ju Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 262 days.

(21) Appl. No.: 14/082,891

(22) Filed: Nov. 18, 2013

(65) Prior Publication Data

US 2014/0380008 A1  Dec. 25, 2014

(30) Foreign Application Priority Data

Jun. 20, 2013 (KR) ........................ 10-2013-0071136

(51) Int. Cl.
  *G06F 1/00* (2006.01)
  *G06F 1/30* (2006.01)
  *G06F 1/26* (2006.01)

(52) U.S. Cl.
  CPC ................ *G06F 1/30* (2013.01); *G06F 1/263* (2013.01)

(58) Field of Classification Search
  CPC ................ G06F 1/28; G06F 1/263; G06F 1/30
  See application file for complete search history.

(56) References Cited

U.S. PATENT DOCUMENTS

| 2004/0170056 A1* | 9/2004 | Shibata ............... G11C 11/5628 365/185.03 |
| 2006/0020855 A1* | 1/2006 | Okada ................. G06F 11/1441 714/14 |
| 2008/0288743 A1* | 11/2008 | Kim ..................... G06F 12/0246 711/206 |
| 2009/0287893 A1 | 11/2009 | Cheng et al. |
| 2011/0055625 A1* | 3/2011 | Honda .................. G06F 11/141 714/6.11 |
| 2012/0231730 A1* | 9/2012 | Liu ........................ G06F 21/86 455/26.1 |
| 2013/0054903 A1* | 2/2013 | Wang ..................... G06F 12/00 711/154 |
| 2014/0164680 A1* | 6/2014 | Lai ........................ G06F 3/0679 711/103 |

FOREIGN PATENT DOCUMENTS

| KR | 1020080100717 | 11/2008 |
| KR | 1020090002812 | 1/2009 |
| KR | 1020110078049 | 7/2011 |
| KR | 101139774 | 4/2012 |

\* cited by examiner

*Primary Examiner* — Jaweed A Abbaszadeh
*Assistant Examiner* — Austin Hicks
(74) *Attorney, Agent, or Firm* — IP & T Group LLP

(57) ABSTRACT

A memory system and an operating method thereof stably supplies power, so that it is possible to improve performance of a memory system by omitting an operation, which has been performed in order to prevent an error due to the blocking of a power supply, in a condition in which an error due to the blocking of the power supply may not be generated.

12 Claims, 3 Drawing Sheets

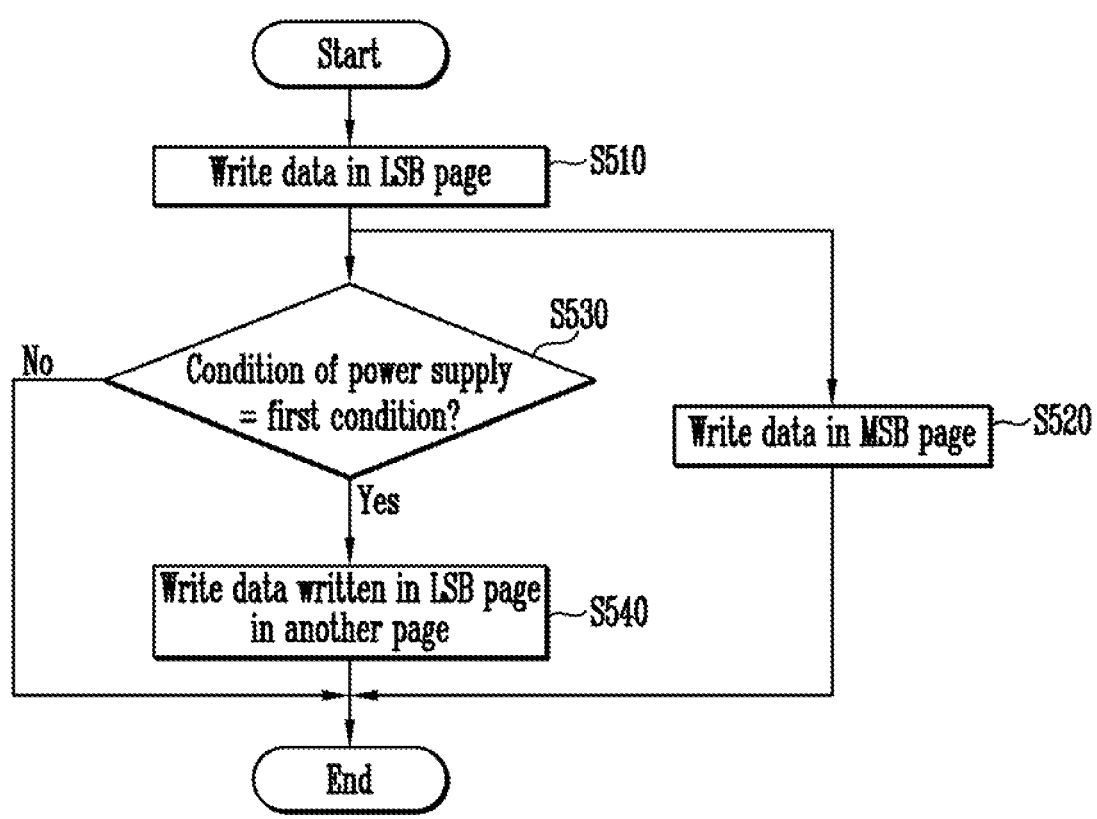

MEMORY SYSTEM AND OPERATING METHOD THEREOF

CROSS-REFERENCE TO RELATED APPLICATION

The present application claims priority to Korean patent application number 10-2013-0071136 filed on Jun. 20, 2013, in the Korean Intellectual Property Office, the entire disclosure of which is incorporated by reference herein.

BACKGROUND

1. Technical Field

The present invention relates to an electronic device, and more particularly, to a memory system, and an operation method thereof.

2. Related Art

A semiconductor memory device included in a memory system is generally classified into a volatile memory device and a nonvolatile memory device.

The volatile memory device has a high write and read rate, but stored data dissipates when a power supply is blocked. The nonvolatile memory device has a relatively low write and read rate, but stored data is maintained even after a power supply is blocked. Accordingly, the nonvolatile memory device is used in order to store data, which needs to be maintained regardless of the power supply. Examples of the nonvolatile memory device includes a Read Only Memory (ROM), a Mask ROM (MROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like. The flash memory is generally divided into a NOR type and a NAND type.

The flash memory has an advantage of the RAM in which data is freely programmed and erased, and an advantage of the ROM in which stored data can be maintained even after a power supply is blocked. The flash memory has low power consumption, fast data access performance, and a small size compared to a disc in the related art, such as a hard disc. Further, the flash memory is advantageously strong against a physical impact and light. The flash memory is widely used as a storage medium of a portable electronic device, such as a Personal Digital Assistant (PDA) and an MP3 player.

In the memory system, when a supply of power necessary for performing an operation is blocked, an operation error is generated. Accordingly, the memory system performs particular operations in order to prevent the operation error.

However, there is a problem in that performance of the memory system deteriorates due to the performance of the particular operations.

SUMMARY

The present invention is made in an effort to provide a memory system capable of improving performance of the memory system, and an operation method thereof.

An embodiment of the present invention provides a memory system, including a memory, a memory controller suitable for controlling a set operation of the memory, and a power detector suitable for generating a detection signal based on a power supply from a limited power supply source and an external power supply source, in which the memory controller is suitable for omitting the set operation based on the detection signal.

The memory controller may confirm whether to omit the set operation to a host based on the detection signal, and when the host allows the omission of the set operation, the set operation may be omitted.

The memory controller performs the set operation, if the power supply is blocked.

If data of at least two bits is stored in the memory, the set operation may be writing bit information of a first page, and then writing the bit information of the first page in a third page when writing bit information of second page.

The limited power supply source may include a battery, and the external power supply source may be connected to the power detector through a power cable.

The power detector may be suitable for not generating the detection signal when a cover of the battery is separated from a potable phone.

Another embodiment of the present invention provides a method of operating a memory system, including detecting a condition of a power supply from a power supply source including a limited power supply source and an external power supply source, and omitting a set operation, if the condition of the power supply is a first condition in which the power source is supplied from the limited power supply source and the external power supply source.

The method may further include confirming whether to omit the set operation to a host when the condition of the power supply is the first condition; and omitting the set operation when the host allows the omission of the set operation.

If data of at least two bits is stored in the memory, the set operation may be performed after writing bit information of a first page. More specifically, the set operation may be writing the bit information of the first page in a third page when writing bit information of second page.

The limited power supply source may include a battery, and the external power supply source may be connected to the memory system through a power cable.

If a cover of the battery is separated from the portable phone, the set operation may be performed.

According to the embodiment of the present invention, power is stably supplied, so that it is possible to improve performance of a memory system by omitting an operation, which has been performed in order to prevent an error due to the blocking of a power supply, in a condition in which an error due to the blocking of the power supply is not generated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 5 is a flowchart illustrating the operation method of the memory system to which the set operation shown in FIG. 3 is particularly applied.

DETAILED DESCRIPTION

Figure 1:
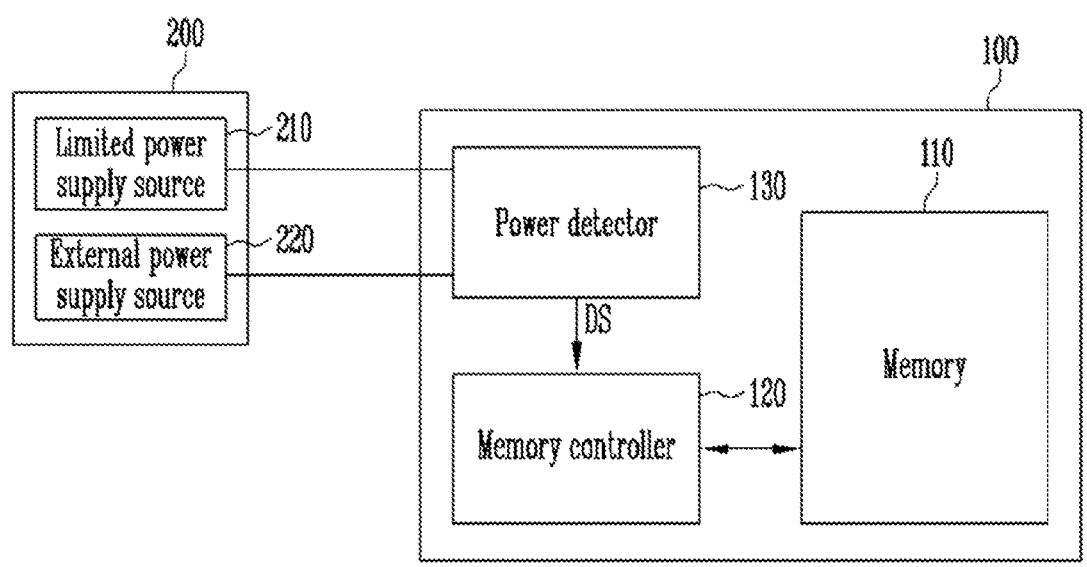
FIG. 1 is a block diagram illustrating a memory system according to an embodiment of the present invention.

Hereinafter, an embodiment of the present invention will be described with reference to the accompanying drawings in detail. However, the present invention is not limited to an embodiment disclosed below and may be implemented in various forms and the scope of the present invention is not limited to the following embodiments. Rather, the embodiment is provided to more sincerely and fully disclose the present invention and to completely transfer the spirit of the present invention to those skilled in the art to which the present invention pertains, and the scope of the present invention should be understood by the claims of the present invention. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

Especially, in a flash memory among the semiconductor memories, a corresponding sector needs to be vacant in order to perform a write operation on a specific sector, contrary to a hard disc. That is, overwriting is not allowed for a sector in which data is already written. Accordingly, in this case, the write operation needs to be performed after erasing the entire block including the sector through an erase operation. However, a time for performing the erase operation of the block is much longer than the write operation and a read operation. A flash memory is characterized in that it is difficult to replace a hard disc in the related art with the flash memory, and entire performance of a flash memory system may deteriorate.

In order to alleviate such concerns of the flash memory, a system software, such as a Flash Translation Layer (hereinafter, referred to as the "FTL"), is used. The FTL is positioned between the flash memory and a file system to allow the file system to use the flash memory as a block device, such as a hard disc. When the FTL is used, it is possible to use a file system used in a hard disc in the related art even without a separate file system. The FTL may be included within a storage device separately from a memory controller. The FTL may be included within the memory controller.

The file system may transmit a write request by a sector unit. However, in a case of the flash memory, particularly, a NAND flash memory, a minimum unit of the write operation is a page. The FTL translates a logical address to a physical address through a mapping table.

FIG. 1 is a block diagram illustrating a memory system according to an embodiment of the present invention.

Referring to FIG. 1, a memory system 100 includes a memory 110, a memory controller 120, and a power detector 130.

The memory controller 120 may control a set operation of the memory 110.

A power supply source 200 includes a limited power supply source 210 and an external power supply source 220. As an embodiment, the limited power supply source 210 may include a battery. The external power supply source 220 may be connected to the power detector through a power cable.

The power detector 130 detects a connection between thelimited power supply source 210 and the external power supply source 220. The power detector 130 may generate a detection signal DS based on a power supply from the limited power supply source 210 and the external power supply source 220.

The power detector 130 may generate the detection signal DS if the battery is in a charged state, and a power is supplied from the external power supply source 220 through the power cable.

The memory system 100 may be applied to a portable phone. The power detector 130 may not generate the detection signal DS, if a cover of the battery is separated from the portable phone.

The memory controller 120 may omit the set operation of the memory 110 based on the detection signal DS.

Particularly, the set operation may be an operation performed in order to prevent an error generated, if a power supply to the memory system is blocked.

More particularly, if data with at least two bits is stored in the memory, the set operation may be performed after an operation of writing bit information of a first page (LSB page). In other words, the set operation may be writing the bit information of the first page n a third page when writing bit information of a second page (MSB page). The third page may be included in another memory block, different from a memory block including the first page and the second page.

Figure 2:
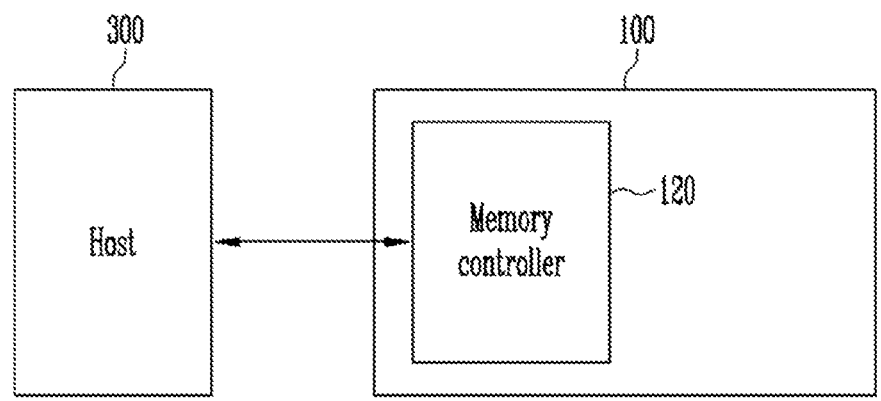
FIG. 2 is a block diagram illustrating an operation between a memory controller of FIG. 1 and a host.

FIG. 2 is a block diagram illustrating an operation between the memory controller of FIG. 1 and a host.

Referring to FIG. 2, the memory controller 120 may control a set operation of the memory 110 according to a command of a host 300.

The memory controller 120 confirms whether to omit the set operation based on the detection signal DS from the power detector 130 to the host 300.

The memory controller 120 may control the memory to omit the set operation, if the host 300 allows the omission of the set operation. Accordingly, it is possible to improve performance of the memory system.

Figure 3:
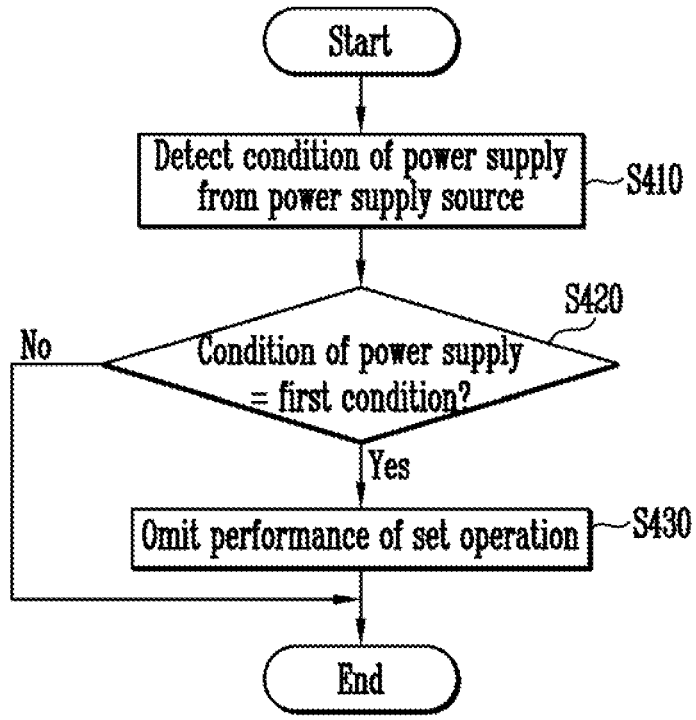
FIG. 3 is a flowchart illustrating an operation method of the memory system according to the embodiment of the present invention.

FIG. 3 is a flowchart illustrating an operation method of the memory system according to the embodiment of the present invention.

Referring to FIG. 3, in the operation method of the memory system, a condition of a power supply from the power supply source including the limited power supply source and the external power supply source is detected (S410).

The condition of the power supply from the power supply source is identified (S420), and a set operation may be omitted if the condition of the power supply is in a first condition in which the power source is supplied from the limited power supply source and the external power supply source (S430).

If the limited power supply source is the battery, and the memory system is connected to the external power supply source through the power cable, when the battery is in the charged state and the power source is supplied from the external power supply source through the power cable, it is determined that the condition of the power supply is in the first condition, so that the set operation may be omitted.

If the memory system is applied to a portable phone, when the cover of the battery is separated, it is determined that the condition of the power supply is not in the first condition, so that the set operation may not be omitted (that is, the set operation may be performed).

Particularly, the set operation may be an operation performed in order to prevent an error generated, if the power supply is blocked.

More particularly, in a case where data with at least two bits is stored in the memory, the set operation may be an operation of writing bit information of a first page (LSB page), and then writing the bit information of the first page in a third page when writing bit information of a second page (MSB page). The third page may be included in another memory block, different from a memory block including the first page and the second page.

Figure 4:
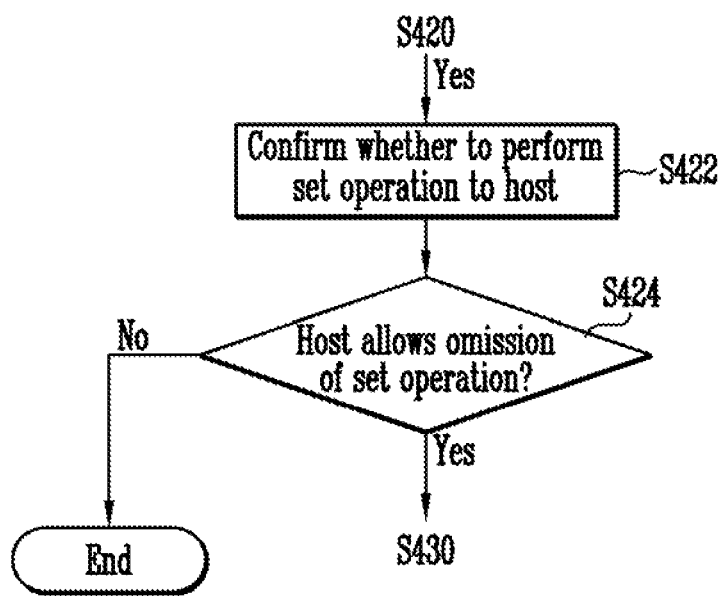
FIG. 4 is a flowchart illustrating the operation method of the memory system of FIG. 3 in detail.

FIG. 4 is a flowchart illustrating the operation method of the memory system of FIG. 3 in detail.

Referring to FIG. 4, the condition of the power supply from the power supply source including the limited power supply source and the external power supply source is detected, and when the condition of the power supply is the first condition in which the power source is supplied from the limited power supply source and the external power supply source, whether to omit the set operation is confirmed by the host (S422 and S424).

When the host allows the omission of the set operation, the set operation may be omitted (S430). Accordingly, it is possible to improve performance of the memory system.

FIG. 5 is a flowchart illustrating the operation method of the memory system to which the set operation shown in FIG. 3 is particularly applied.

If the data of two bits is stored in the memory, the memory controller may control the memory to write the bit information of the LSB page and then to write the bit information of the LSB page in another page when writing the bit information of the MSB page. When the power supply is blocked, so that an error is generated in the bit information of the LSB page, the bit information of the LSB page written in another page is read, and then the bit information of the MSB page is written, thereby preventing a fail from being generated.

Referring to FIG. 5, if the data of two bits is stored in the memory, the data is written in the LSB page (S510).

The data is written in the MSB page (S520), and the condition of the power supply from the power supply source including the limited power supply source and the external power supply source is detected (S530).

When the condition of the power supply is not in the first condition in which the power source is supplied from the limited power supply source and the external power supply source, the data written in the LSB page is written in another page (S540).

When the condition of the power supply is in the first condition in which the power source is supplied from the limited power supply source and the external power supply source, the operation of writing the data written in the LSB page in another page may be omitted. Accordingly, it is possible to improve performance of the memory system.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A memory system, comprising:
   a memory including a plurality of memory blocks;
   a memory controller suitable for controlling a set operation of the memory; and
   a power detector suitable for generating a detection signal based on a power supply from a limited power supply source and an external power supply source,
   wherein the memory controller is suitable for determining whether to perform the set operation based on the detection signal generated based on the power supply from the power supply sources,
   wherein the set operation is performed if the condition of the power supply is not a first condition,
   wherein in the first condition the power source is supplied from the limited power supply source and the external power supply source,
   wherein the memory controller controls the memory to write a first bit information into a first page in a first memory block, and then to write a second bit information into a second page in the first memory block,
   wherein the set operation is writing the first bit information written in the first page into a third page in a second memory block which is different from the first memory block during the writing of the second bit information into the second page, and
   wherein the memory controller confirms whether to perform the set operation to a host based on the detection signal, and when the host allows the performance of the set operation, the set operation is performed.

2. The memory system of claim 1, wherein the memory controller performs the set operation, if the power supply is blocked.

3. The memory system of claim 2, wherein if data of at least two bits is stored in the memory, the set operation is writing bit information of a first page, and then writing the bit information of the first page in a third page when writing bit information of second page.

4. The memory system of claim 1, wherein the limited power supply source includes a battery, and the external power supply source is connected to the power detector through a power cable.

5. The memory system of claim 4, wherein the power detector is suitable for not generating the detection signal when a cover of the battery is separated from a portable phone.

6. The memory system of claim 1, wherein the first page is least significant bit page, and the second page is most significant bit page.

7. A method of operating a memory system including a memory, comprising:
   detecting a condition of a power supply from a power supply source including a limited power supply source and an external power supply source;
   determining whether to perform a set operation based on the detected condition;
   confirming whether to perform the set operation to a host when the condition of the power supply is the first condition; and
   performing the set operation when the host allows the performance of the set operation,
   wherein the set operation is performed if the condition of the power supply is not a first condition, wherein in the first condition the power source is supplied from the limited power supply source and the external power supply source, wherein if data of at least two-bit information is stored in a memory cell of the memory, the set operation is writing a first bit information of the data written in a first page into a third page during writing of a second bit information of the data into a second page, and wherein the memory includes a plurality of memory blocks, the first page and the second page are in a first memory block of the memory, and the third page is in a second memory block which is different from the first memory block.

8. The method of claim 7, wherein the limited power supply source includes a battery, and the external power supply source is connected to the memory system through a power cable.

9. The method of claim 8, wherein if a cover of the battery is separated from the portable phone, the set operation is performed.

10. The method of claim 7, wherein the first page is least significant bit page, and the second page is most significant bit page.

11. A method of operating a memory system including a memory controller and a memory having a plurality of memory blocks, the method comprising:

writing a first data into a first page in a first memory block of the memory;

detecting a condition of a power supply from a power supply source including a limited power supply source and an external power supply source;

determining whether to perform a set operation based on the condition of the power supply from the power supply source; and writing a second data into a second page in the first memory block of the memory, wherein the set operation is performed during the writing of the second data into the second page, if the condition of the power supply is not a first condition, wherein in the first condition the power source is supplied from the limited power supply source and the external power supply source, wherein the set operation is writing the first data, which is written in the first page, into a third page in a second memory block which is different from the first memory block, and wherein the memory controller confirms whether to perform the set operation to a host based on the detection signal, and when the host allows the performance of the set operation, the set operation is performed.

12. The method of claim 11, wherein the first page is least significant bit page, and the second page is most significant bit page.

* * * * *